United States Patent
Marsili et al.

(10) Patent No.: US 8,779,740 B2
(45) Date of Patent: Jul. 15, 2014

(54) DIGITAL SLIDING MODE CONTROLLER FOR DC/DC CONVERTERS

(75) Inventors: Stefano Marsili, Faak am See (AT); Matteo Agostinelli, Villach (AT); Robert Priewasser, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 457 days.

(21) Appl. No.: 13/213,278

(22) Filed: Aug. 19, 2011

(65) Prior Publication Data

US 2013/0043852 A1 Feb. 21, 2013

(51) Int. Cl.
*H02M 3/157* (2006.01)

(52) U.S. Cl.
USPC .......................................................... 323/283

(58) Field of Classification Search
CPC ...... H02M 3/157; G05B 13/042; G05B 13/02
USPC .......... 323/234, 282, 283; 363/74; 700/28, 37
See application file for complete search history.

(56) References Cited

U.S. PATENT DOCUMENTS

| | | | |
|---|---|---|---|
| 6,166,527 A | 12/2000 | Dwelley et al. | |
| 2009/0267582 A1 | 10/2009 | Prodic et al. | |
| 2010/0131219 A1 | 5/2010 | Kenly et al. | |
| 2010/0141230 A1 | 6/2010 | Lukic et al. | |
| 2011/0115453 A1 | 5/2011 | Marsili et al. | |

OTHER PUBLICATIONS

Tsang-Li Tai and Jian-Shiang Chen, "UPS Inverter Design Using Discrete-Time Sliding-Mode Control Scheme", IEEE Trans. Ind. Electron., vol. 49, No. 1, Feb. 2002.*

S.B.Guo, X.F.Lin-Shi, B.Allard, Y.X.Gao, and Y.Ruan, "Digital Sliding mode controller for high-frequency DC/DC SMPS," IEEE Trans. Power Electron., vol. 25, No. 5, pp. 1120-1123, May 2010.*
Vorpérian, V., "Simplified Analysis of PWM Converters Using Model of PWM Switch Part II: Discontinuous Conduction Mode," IEEE Transactions on Aerospace and Electronic Systems, vol. 26, No. 3, May 1990, pp. 497-505, IEEE.
Mattavelli, P., et al., "General-Purpose Sliding-Mode Controller for DC/DC Converter Applications," 24th Annual IEEE Power Electronics Specialist Conference, 1993, 7 pages, IEEE.
Spiazzi, G., et al., "Sliding Mode Control of DC-DC Converters," 1997, 10 pages, University of Padova, Padova, Italy.
"Understanding Boost Power Stages in Switchmode Power Supplies," Mar. 1999, Texas Instruments Application Report, Mixed Signal Products, SLVA061, 32 pages.
Erickson, R. W., "Fundamentals of Power Electronics, Second Edition," Chapter 12.1, pp. 441-449, 2001, Kluwer Acedemic Publishers. Seacaucus, NJ.
Rogers, E., "Understanding Buck-Boost Power Stages in Switch Mode Power Supplies," Revised Nov. 2002, Texas Instruments Application Report, SLVA059A, 32 pages.
Tan, S-C, et al., "On the Practical Design of a Sliding Mode Voltage Controlled Buck Converter," IEEE Transactions on Power Electronics, vol. 20, No. 2, Mar. 2005, pp. 425-437, IEEE.

* cited by examiner

*Primary Examiner* — Adolf Berhane
*Assistant Examiner* — Jyu-June Lee
(74) *Attorney, Agent, or Firm* — Slater & Matsil, L.L.P.

(57) ABSTRACT

An embodiment switching converter includes a power stage that receives an input voltage for converting it into an output voltage and provides a load current to a load operably coupled to the power stage. The power stage includes an inductor carrying an inductor current and a digital controller configured to regulate the output voltage to a level close to a reference voltage using a pulse width modulated (PWM) signal supplied to the power stage.

20 Claims, 5 Drawing Sheets

(a) buck converter power stage  (b) boost converter power stage

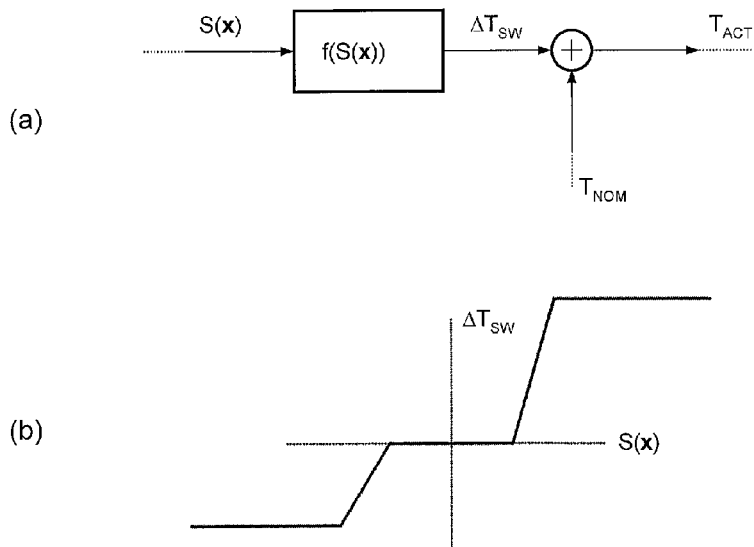
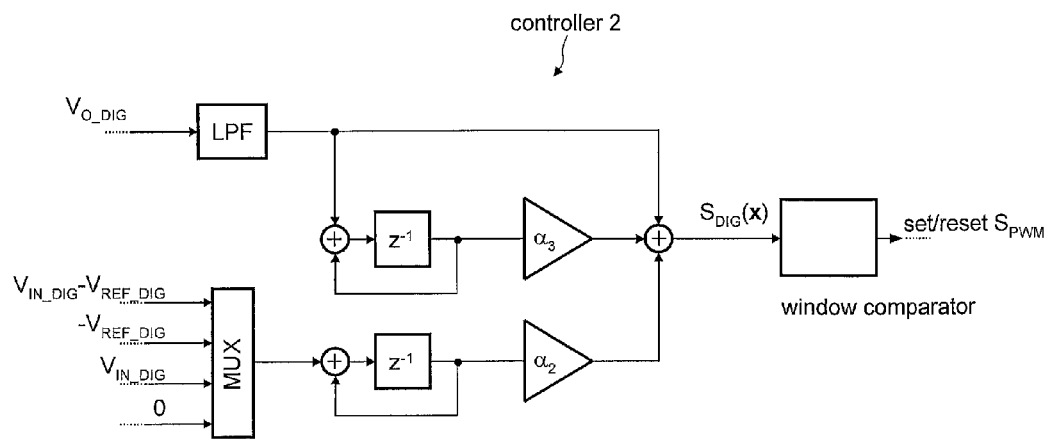
FIG. 8
FIG. 9

US 8,779,740 B2

DIGITAL SLIDING MODE CONTROLLER FOR DC/DC CONVERTERS

TECHNICAL FIELD

The present invention relates to the field of switching converters, in particular to non-linear digital control of DC/DC converters such as buck converters, boost converters, and buck-boost converters.

BACKGROUND

In electronic devices DC to DC switching converters are increasingly used to convert a DC input voltage at one level to a desired DC output voltage at another level. Dependent on the converter topology (buck converter, boost converter, etc.) the output voltage can be lower or higher than the input voltage. In practical applications a robust control of switching converters may be a challenging task, as the controller has to cope with different modes of operation (e.g., continuous conduction mode CCM, discontinuous conduction mode DCM, feed forward compensation, etc.) which may change dependent on the actual load supplied by the switching converter. Further abrupt changes of the required load current may induce instabilities due to required mode changes (e.g., DCM to CCM when the load current drops to small values).

A robust controller design may therefore be relatively complicated. Mode changes have to be detected and the corresponding control parameters have to be reconfigured. However, mode changes still lead to undesired transient disturbances in the output voltage and instabilities may still occur in some situations, particularly when the converter is operating in its limit range or changing operating modes. Accordingly, there is a continued need for an improved DC/DC converter and operational methods which allow for a robust control of the switching converter that minimizes transient disturbances and instabilities due to load variations and/or variations of the input voltage.

SUMMARY OF THE INVENTION

A switching converter is disclosed. In accordance with one example of the invention the switching converter includes a power stage receiving an input voltage for converting it into an output voltage and for providing a load current to a load operably coupled to the power stage. The power stage comprises an inductor carrying an inductor current and a digital controller configured to regulate the output voltage to a level close to a reference voltage using a pulse width modulated (PWM) signal supplied to the power stage. The PWM signal has a duty cycle, wherein the controller regularly calculates a digital sliding function from one or more of the following: a digital representation of the output voltage, a digitally integrated output voltage value, a digital estimation of the inductor current, and a digital ramp signal value. The duty cycle of the PWM signal is set dependent on the calculated sliding function.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings:

FIG. 1a and FIG. 1b, collectively

FIG. 6a and FIG. 6b, collectively

FIG. 8a and FIG. 8b, collectively FIG. 8, illustrate an enhancement of the controller structure illustrated in FIGS. 3 and 4 allowing a variable PWM frequency;

FIG. 9 illustrates an alternative controller structure to the one illustrated in FIG. 4.

DETAILED DESCRIPTION OF ILLUSTRATIVE EMBODIMENTS

Figure 1:
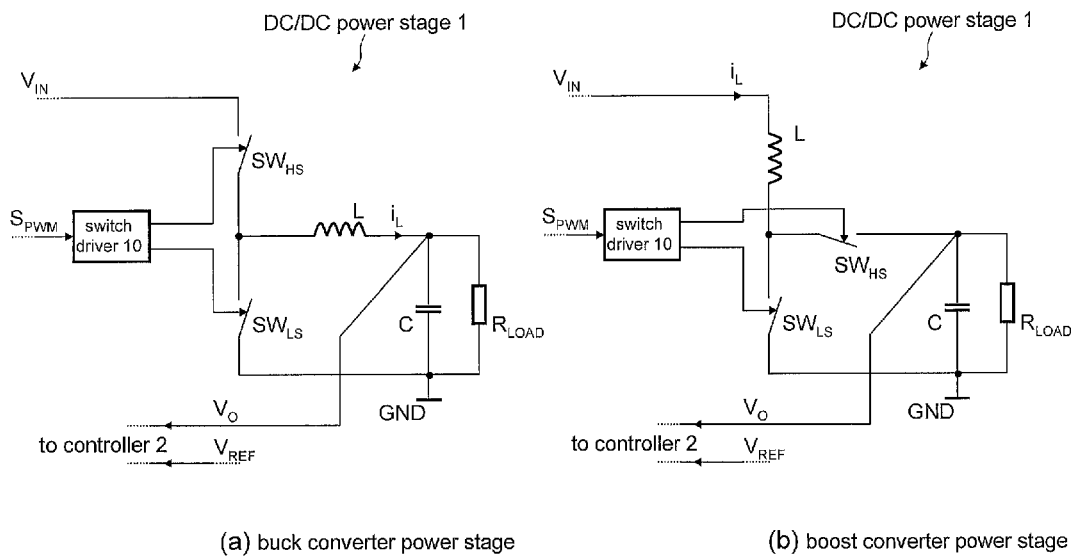
FIG. 1, illustrate the power stages of a buck converter and a boost converter as two exemplary switching converter topologies.

One or more implementations will now be described with reference to the attached drawings, wherein like reference numerals are used to refer to like elements throughout. Systems and methods are disclosed for a DC/DC (DC-to-DC) power converter, that includes a nonlinear digital controller configured to receive one or more feedback variables (representative of, e.g., the power converter output voltage and/or the coil current) from the switching converter power stage. The nonlinear digital controller is configured to generate a pulse width modulation (PWM) signal therefrom.

FIGS. 1a and 1b, collectively FIG. 1, illustrate, as an example, the typical design of a buck converter power stage (FIG. 1a) and a boost converter power stage (FIG. 1b). The buck converter power stage includes a power transistor half bridge (low side switch $SW_{LS}$ and high side switch SWHS) coupled between a supply potential $V_{IN}$ (input voltage) and a reference potential GND (for unipolar output voltages). The common circuit node of the two transistors is coupled to an output terminal via an inductor L. A capacitor C is coupled between the output terminal and the reference potential GND and the load (here represented by the resistor $R_{LOAD}$) is connected parallel to the capacitor C. A switch driver 10 receives a PWM signal and provides corresponding driver signals supplied to the gates of the two transistors (i.e., low side switch $SW_{LS}$ and high side switch $SW_{HS}$). Usually, the output voltage $V_O$ and a reference voltage $V_{REF}$ are fed back to the controller 2 (not shown in FIG. 1). The boost converter topology of FIG. 1b is almost identical with the buck converter topology of FIG. 1a, the only difference is that the inductor L (inductor current iL) and the high side switch $SW_{HS}$ are interchanged. Besides the buck converters and boost converters, so-called buck-boost converters are known. A good review on buck-boost converters is, e.g., given in Everett Rogers: Understanding Buck-Boost Power Stages in Switched Mode Power Supplies, Application Report, Texas Instruments, SLVA059A, re. November 2002 which is hereby incorporated by reference.

Both buck converters and boost converters may be operated in continuous conduction mode (CCM) or discontinuous conduction mode (DCM) dependent on the load coupled to the power converter output stage (power stage). DCM and CCM is also discussed on the Application Report cited above. One can see that there are several different modes a power converter can operate (e.g., boost/CCM, boost/DCM, buck/DCM, buck/CCM). Known controllers employ PID regulators (proportional-integrating-derivating, short PID) for regulating the output voltage $V_O$. However, the PID regulator has to be reconfigured during operation when a mode change (e.g., CCM to DCM) is required as a result of a change of the load connected to the power stage's output. The reconfiguration is necessary as the regulator is usually based on the converter's small signal model which is different for different operating modes. For example, the "D" component of the PID regulator may be deactivated when changing to DCM so that during DCM the regulator effectively operates as a PI regulator. This reconfiguration of the controller results in a difficult controller design as many boundary cases need to be checked to ensure stability and proper performance. Further, reconfiguring the controller requires some time during which the system is operating in a sub-optimal state leading to unwanted transient disturbances. Finally, the selection of the appropriate mode of operation in the transition region between two modes of operation may be difficult and lead to instabilities.

In view of the above it would be desirable to have a unified controller capable of handling different modes of operation without the need for reconfiguring the controller parameters when a mode change is required. The control parameters are defined based on the circuit components (inductor L, capacitor C), the desired PWM switching frequency and the sampling frequency of the analog-to-digital converter (ADC) used for digitizing the output voltage $V_O$.

So-called sliding mode control alleviates some problems discussed above with respect to the "classical" PID controller. When applying sliding mode control a so-called sliding function S(x) is determined from a number of internal states (collectively referred to as vector x) of the switching converter's power stage. For example, the sliding function S(x) may be chosen as follows:

$$S(x)=(V_O-V_{REF})+\alpha 2 \cdot iL+\alpha 3 \cdot \int(V_O-V_{REF})dt, \quad (1)$$

thus linearly combining the output voltage $V_O$ and the coil current $i_L$, wherein the PWM signal is switched from a low level to a high level, when falling below a threshold TH1, and is switched from a high level to a low level, when a second threshold TH2 is exceeded (TH1<TH2). This may achieved using a comparator with hysteresis. The third (integrating) term in equation (1) is responsible for the cancellation of (small) steady state errors. Such an approach provides good performance of the regulation of the switching converter output voltage $V_O$ but the PWM switching frequency may vary which is undesirable in applications where electromagnetic interferences (EMI) are critical and electromagnetic compatibility (EMC) is a design goal as in such cases it is good to know the frequency of the disturbances.

Figure 2:
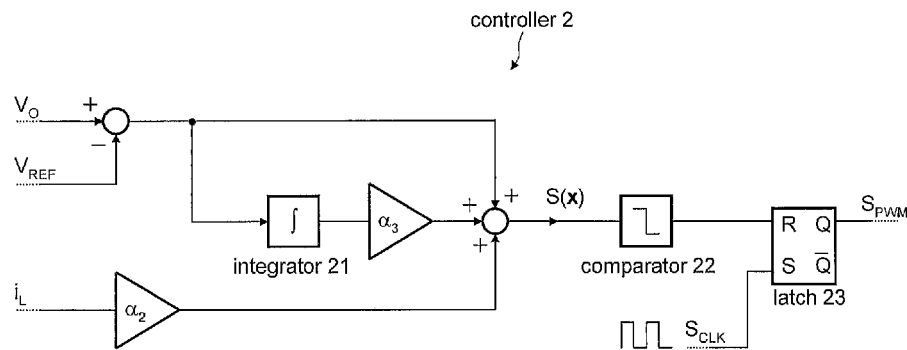
FIG. 2 illustrates the principle of so-called sliding mode control which may be employed to control switching converters.

FIG. 2 illustrates a block diagram illustrating the signal flow in accordance with the sliding function of equation (1) but in contrast to the example discussed above, the PWM signal $S_{PWM}$ is set to a high level in accordance with the fixed frequency of a clock signal $S_{CLK}$ provided by a clock generator and is reset to a low signal when the sliding function S(x) via comparator 22 exceeds a defined threshold (e.g., zero). The setting and resetting of the PWM signal $S_{PWM}$ is achieved with a latch 23 (e.g., a SR flip flop) and the integral in equation (1) is realized by the integrator 21. Thus, the block diagram of FIG. 2 exactly implements the sliding function S(x) of equation (1). Although, the controller operating at a fixed frequency entails some advantages the current disclosure is not limited to such implementations (see also FIG. 9).

Figure 3:
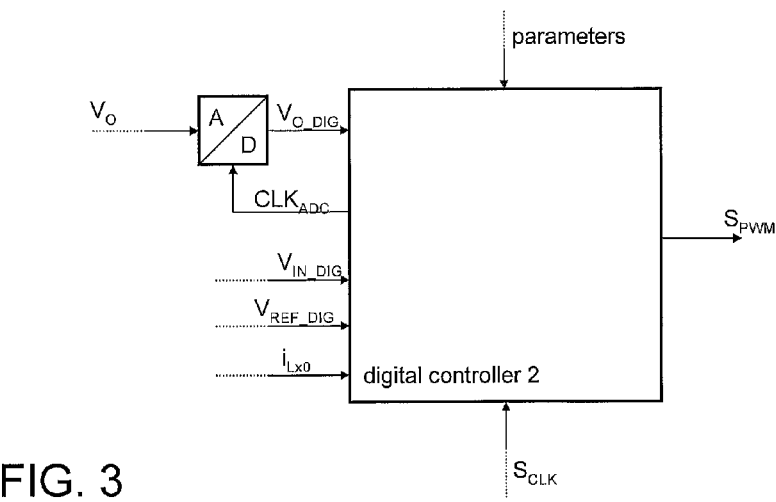
FIG. 3 illustrates one exemplary digital controller for a DC/DC converter.

FIG. 3 illustrates one example of a digital controller 2 in accordance with the present invention and the (digital) input signals supplied thereto. The power stage output voltage $V_O$ is digitized using an analog-to-digital converter 26 which is clocked by a clock signal $CLK_{ADC}$ provided by the controller 2. However, the ADC clock signal $CLK_{ADC}$ may alternatively be provided by an external clock source. The clock signal $CLK_{ADC}$ determines the time instance at which the output voltage $V_O$ is sampled. The resulting digital representation of the output voltage $V_{O\_DIG}$ is supplied to the controller 2. Further, a digital representation of the DC input voltage $V_{IN\_DIG}$, a digital representation of the reference voltage $V_{REF\_DIG}$ and the (preset) digital controller parameters are also supplied to the controller 2. The input voltage $V_{IN\_DIG}$ may be obtained from another analog-to-digital converter, the reference voltage $V_{REF\_DIG}$ may be a constant value stored in a register. In implementations in which the input voltage $V_{IN}$ supplied to the power stage is essentially constant (e.g., as it is regulated by a pre-regulator), the digital input signal $V_{IN\_DIG}$ can be replaced by a constant digital value stored, e.g., in a register. Further, the controller 2 is supplied with a clock signal $S_{CLK}$ whose frequency determines the clocking of the digital part of the controller. Finally, a 1-bit binary signal $i_{Lx0}$ may be supplied to the controller 2, in systems which have to be able to operate in DCM. The signal $i_{Lx0}$ indicates (e.g., by providing a high level, i.e., a logic "1") when the coil current $i_L$ has dropped to values equal to or smaller than zero. For systems that only operate in CCM the signal $i_{Lx0}$ may be replaced by a constant (e.g., a low level, i.e., a logic "0") stored in a register, alternatively the respective input pin may be permanently tied to a low level.

Figure 4:
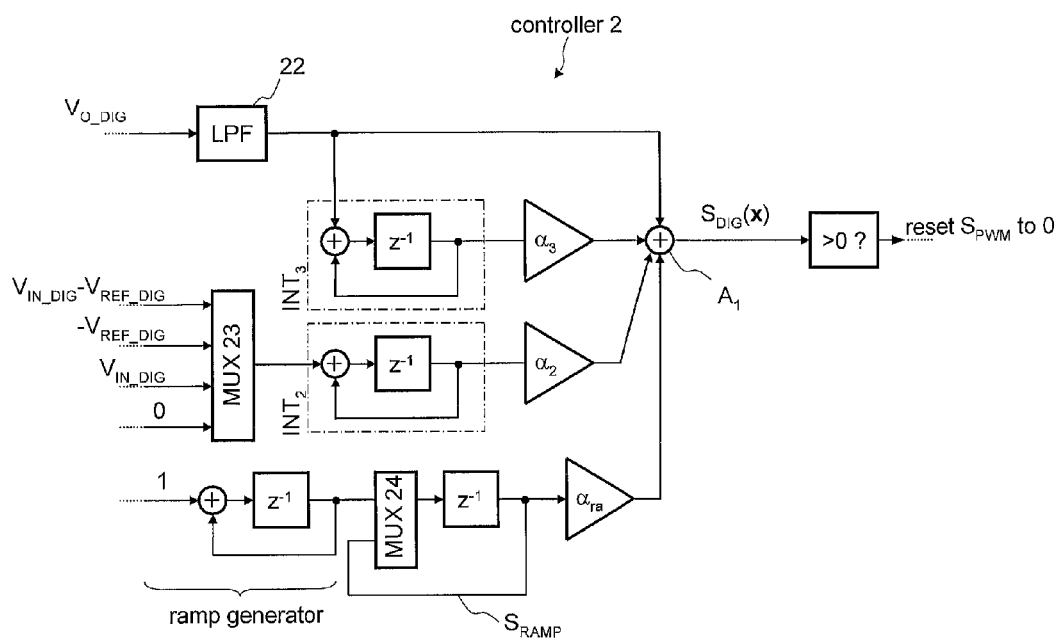
FIG. 4 illustrates the function of the controller of FIG. 3 in more detail with the help of a block diagram.

The functions according to which the input signals supplied to the controller 2 are processed to obtain the PWM signal at the output is illustrated by the exemplary (digital) signal flow chart of FIG. 4 and explained below with reference thereto. FIG. 4 illustrates the calculations which have to be performed by the digital controller 2 during one switching period of the PWM signal $S_{PWM}$ (i.e., during one PWM cycle). The signal flow chart includes four branches which are combined at the accumulator $A_1$ which sums up the digital output values of the three branches and provides the digital sliding function $S_{DIG}(x)$, whereas the vector x represents the input signals discussed above with reference to FIG. 3.

Figure 5:
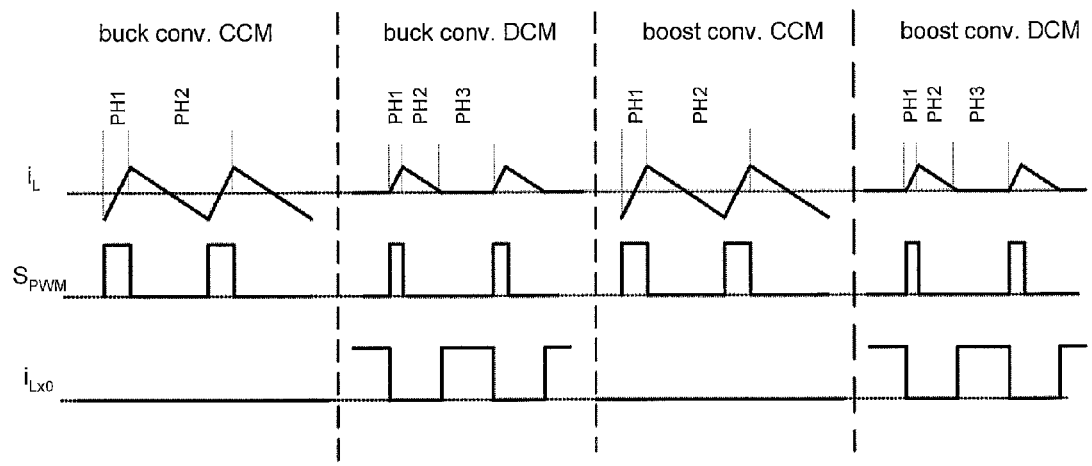
FIG. 5 illustrates the coil current of a buck and a boost converter in different modes of operation.

Beginning from the top of FIG. 4 the first branch represents the "proportional component" (P). In the present example it is assumed that $V_{O\_DIG}$ is coded to zero by the ADC 26 when $V_O=V_{REF}$, $V_{O\_DIG}$ is negative when $V_O<V_{REF}$, and $V_{O\_DIG}$ is positive when $V_O>V_{REF}$. As an option, the input signal $V_{O\_DIG}$ may be lowpass filtered by LPF 28 to reduce the high frequency noise content therein. The first summand contributing to the sliding function $S_{DIG}(x)$ is denoted as S1. The second branch represents the "integrating component" (I) provided by a digital integrator $INT_3$ including a unit delay block and an accumulator. The output of the integrator is the third summand (see equation (1)) contributing to the sliding function $S_{DIG}(x)$ and denoted as S3. The summand S3 is scaled by a (constant) control parameter α3 before supplied to the accumulator $A_1$. The integrator $INT_3$ may be operated at a lower sampling rate such that only each 2nd, each 4th, etc. sample is accumulated. The scaling by the factor α3 does not need to be very exact and may be implemented by a shift operation. The third branch represents processes information concerning the coil current $i_L$ which is not directly measured but rather calculated by the controller 2 from the input voltage $V_{IN\_DIG}$ and the reference voltage $V_{REF\_DIG}$. For the coil current calculation the current mode of operation (DCM, CCM, etc.) has to be considered. The following description refers to FIG. 5 where the coil current $i_L$ is illustrated over time as well as the corresponding PWM signal $S_{PWM}$ and the zero crossing signal $i_{Lx0}$.

Three different phases can be identified in the coil current over time for all modes of operation as summarized below.

PH1 (phase 1): For buck converters the high side switch (see FIG. 1a switch $SW_{Hs}$) is closed, the low side switch is open, and the inductor L is "charged", i.e. the inductor current is rising (approximately linearly) and the energy stored in the inductor increases. Similarly, for boost converters, the low side switch (see FIG. 1b switch $SW_{LS}$) is closed and the high side switch is open. The inductor current is rising (approximately linearly) and the energy stored in the inductor increases. The steepness (amperes per second) of the inductor current thereby is (VIN−VO)/L for buck converters (see FIG. 1a) and VIN/L for boost converters (see FIG. 1b). This phase can be observed in CCM and DCM for buck converters as well as for boost converters.

PH2 (phase 2): For buck converters the high side switch (see FIG. 1a switch $SW_{HS}$) is open and the low side switch is closed during this phase so that the inductor L "discharges". Similarly, for boost converters the low side switch (see FIG. 1b switch $SW_{LS}$) is open and the high side switch is closed. The inductor current is falling (approximately linearly) and the energy stored in the inductor decreases as being transferred to the output capacitor and the load. The steepness (amperes per second) of the inductor current thereby is −$V_O$/L for buck converters (see FIG. 1a) and ($V_{IN}$−$V_O$)/L for boost converters (see FIG. 1b). This phase can also be observed in CCM and DCM for buck converters as well as for boost converters.

PH3 (phase 3): This phase (zero current phase), during which the inductor current is zero occurs in DCM only. Both switches (high side and low side switch) are open so that the inductor current remains zero. To signal this phase to the controller, the signal $i_{Lx0}$ is set to a high level (logic "1") by a circuitry which is configured to detect a zero crossing in the inductor current. Phase 3 does not exist during CCM.

Referring again to FIG. 4 and assuming that the actual output voltage $V_O$ stays close to the reference voltage $V_{REF}$ one can summarize that the slope of the inductor current $i_L$ is essentially proportional to ($V_{IN\_DIG}$−$V_{REF\_DIG}$), $V_{IN\_DIG}$, or −$V_{REF\_DIG}$ dependent on the mode of operation as shown in the table below.

| Mode of operation | Slope during PH1 | Slope during PH2 | Slope during PH3 |
|---|---|---|---|
| buck conv. CCM | $V_{IN\_DIG}$−$V_{REF\_DIG}$ | −$V_{REF\_DIG}$ | n.a. |
| buck conv. DCM | $V_{IN\_DIG}$−$V_{REF\_DIG}$ | −$V_{REF\_DIG}$ | 0 |
| boost conv. CCM | $V_{IN\_DIG}$ | $V_{IN\_DIG}$−$V_{REF\_DIG}$ | n.a. |
| boost conv. DCM | $V_{IN\_DIG}$ | $V_{IN\_DIG}$−$V_{REF\_DIG}$ | 0 |

The factor 1/L mentioned above may be included in the gain α2 and is therefore not listed in the table above. Knowing the slope of the inductor coil from the system voltages ($V_{IN}$, $V_{REF}$, $V_O$) the actual inductor coil can be calculated (estimated) using a digital integrator $INT_2$ as illustrated in FIG. 4. The resulting estimation of the inductor current is denoted as S2 and contributes (after scaling with α2) to the sliding function S(x). Again, a shift operation may be sufficient to implement the scaling.

It should be noted that the absolute value of the coil current estimation is not relevant for controlling the power stage but rather its AC component. Actually, it is sufficient to reconstruct only the AC component of the coil current $i_L$ which is, roughly, the current through the output capacitor. This is sufficient as the integral term is responsible for removing the steady-state error resulting from an incorrect DC level of the reconstructed coil current.

The fourth branch of the diagram of FIG. 4 has no representation in equation (1). However, the function provided by this branch is required for a proper control of the power stage as outlined below. In steady state the ADC 26 outputs zero (as $V_O$=$V_{REF}$), and the only contribution to the sliding function is the third branch in which the coil current ($i_L$) estimation is processed. This means that, in steady state, it is rather the coil current $i_L$ which is controlled and not the output voltage $V_O$. It is known from literature (see R. W. Erickson, D. Maksimovic: Oscillation for D>0.5 (Section 12.1), in: Fundamentals of Power Electronics, 2nd ed., Springer Science+Business Media, 2001, pp. 441-449) that in a current control scheme with a fixed switching frequency static instabilities may occur when the duty cycle of the PWM signal $S_{PWM}$ is too large (e.g., greater than 50% for a buck converter). This means the duty cycle of the PWM signal $S_{PWM}$ supplied to the power stage may vary between a very small and a very large value (limit cycle) if no ramp correction is performed as provided by the fourth branch of the system of FIG. 4. This may be correct in average but significantly increases undesired effects such as the output voltage ripple and the coil current ripple and may lead, dependent on the actual implementation, to a varying switching frequency which is undesired in some applications.

To avoid or at least alleviate this kind of instability a ramp function may be added to the sliding function which is the function provided by the fourth branch of the diagram of FIG. 4. The ramp function may be, for example, generated using a digital integrator INTR which integrates a constant value, e.g., 1. Alternatively, a counter may be employed. The integrator (or, respectively, the counter) is reset to zero each PWM cycle. During operation in CCM the ramp function is only properly scaled (scaling factor GR). When operating in DCM the output of the fourth branch, which contributes to the coil current estimation, is hold at its current value during phases 2 and 3 (PH2, PH3, see FIG. 5). For this purpose the multiplexer 24 may be used whose second input is selected during PH2 and PH3.

The sum of the output signals of the four branches of the structure of FIG. 4 forms the sliding function $S_{DIG}(x)$. The PWM signal $S_{PWM}$ is set from "0" to "1" (logic values) in accordance with the clock signal $S_{CLK}$ (see FIGS. 2 and 3) and reset from "1" to "0" dependent on the value of the sliding function $S_{DIG}(x)$, e.g., when $S_{DIG}(x)$ exceeds a threshold (which may be zero).

Figure 6:
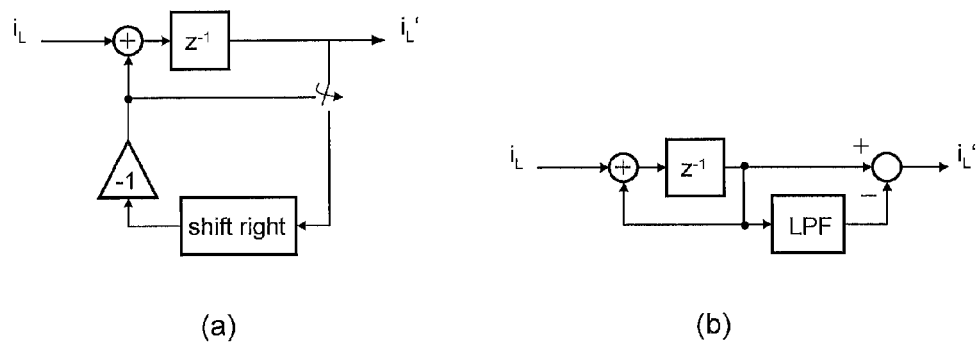
FIG. 6, illustrate two options for compensating for drift effects.

In the following some additional calculation steps which may be performed by the digital controller in each PWM cycle are summarized. As the coil current estimation is based on the assumption of an ideal lossless system, the estimation includes a systematic error. In a real implementation losses occur in the power stage due to parasitic resistances of the power switches, the coil, etc. As a result the required duty cycle of the PWM signal $S_{PWM}$ is slightly higher than in the ideal case of a lossless system. The higher duty cycle causes a positive systematic error at the input of the integrator $INT_2$ which provides the coil current estimation resulting in a drift of the integrator output. Thus, the estimated coil current will sooner or later produce an overflow, and further, the drift is responsible for a steady state error that cannot be compensated for by the integrator $INT_3$ as the drift rate may be "faster" than the integrator $INT_3$. Two possible solutions to this problem are illustrated in FIGS. 6a and 6b, collectively FIG. 6.

The signal processing structure of FIG. 6a or 6b may replace the integrator $INT_2$ in the third branch of FIG. 4. In the example of FIG. 6a, every switching period a fraction of the integrator output (S2) is subtracted from the integrated value (stored in the accumulator register of the integration). The implementation with right shift operation (provides fractions of ½ ¼ ⅛ 1/16, etc.) is accurate enough for the purpose. By considering the losses the integrator $INT_2$ settles to a constant value and any remaining steady state error can be compensated by the integrator $INT_3$ in the second branch of FIG. 4.

In the alternative of FIG. 6b, a low pass filter LPF is used to calculate the (drifting) average value at the output of the integrator $INT_2$. This average is then subtracted from the integrator output scaled and being supplied to adder $A_1$ (see FIG. 4). The low pass filter output follows the drift of the integrator. The difference between integrator output and the average value provided by the low pass filter LPF may be calculated as two's complement number and may be computed even in case of an overflow of the integrator or of the LPF output. The difference is not drifting and the steady state error can again be compensated by the integrator $INT_3$ of the second branch of FIG. 4. This calculation may be done every clock cycle, however once in a PWM cycle may be sufficient and reduces the computational effort.

Finally, another effect has to be considered when operating in discontinuous conduction mode (DCM). As the minimum on-time ($S_{PWM}=1$) of the high side switch cannot be arbitrarily short and thus cannot be shorter than a known minimum on-time, too much energy would be "injected" to the power stage in cases where the load coupled to the power stage is very low. In such a situation the output voltage $V_O$ would drift away from the desired target output voltage $V_{REF}$ (reference voltage). In order to maintain the output voltage $V_O$ at (or close to) the reference voltage $V_{REF}$ the controller may be configured to "skip" some on-pulses in the PWM signal $S_{PWM}$ during DCM. The controller may thus be configured to decide whether to skip an "upcoming" pulse or not. The decision may, again, be made dependent on the current value of the sliding function $S_{PWM}(x)$. That is, just before the start of a PWM cycle it is checked (1.) if the power stage is currently in phase 3 (PH3, see FIG. 5, which is indicated by the signal $i_{Lx0}$) of the discontinuous current mode, and (2.) if the sliding function $S_{DIG}(x)$ is still above a threshold (e.g. zero). If both criteria are confirmed, the subsequent pulse is skipped. It should be noted, that the coil current is zero during phase 3 (PH3) and thus the multiplexer 24 forwards the zero value to the integrator $INT_2$ (see FIG. 4). Alternatively, the output of the integrator $INT_2$ may be set to zero in during phase 3. Further the ramp generation discussed above (see FIG. 4, fourth branch) is "paused" during the phase 2 and 3 (PH2, PH3) in DCM, e.g., by selecting the bottom input at the multiplexer 24 of FIG. 4. As a result, the sliding function $S_{DIG}(x)$ slowly decreases as the output voltage also slowly decreases and due to the "losses" considered in accordance with FIG. 6a or 6b.

Figure 7:
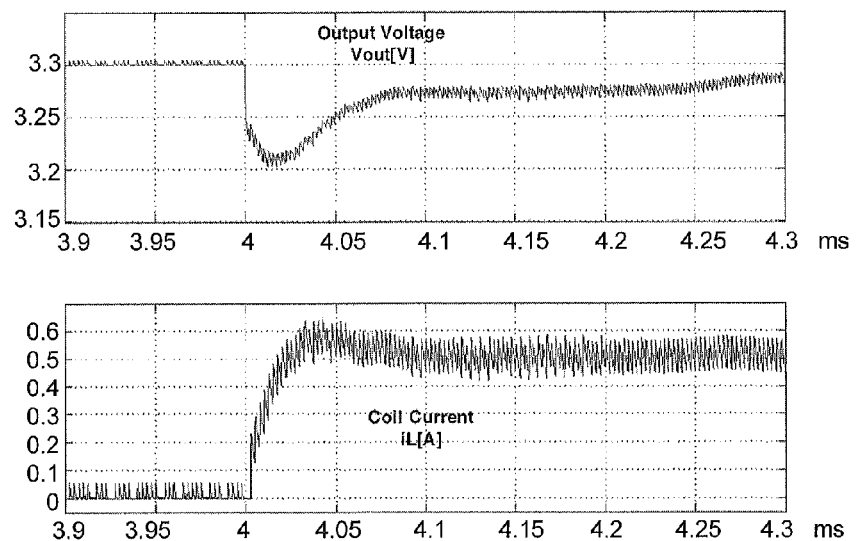
FIG. 7 illustrates the response of the coil current and the corresponding output voltage of a DC/DC converter to an abrupt change of the load.

FIG. 7 illustrates the "step response" of the output voltage $V_O$ and the coil current $i_L$ to an abrupt increase of the load of a 3.3V buck converter. Before the time 4 ms the load current is 10 mA and the system is operating in DCM. It can be seen from the coil current curve that the controller is skipping pulses from time to time in order to keep the output voltage at a level of 3.3 V. At the time 4 ms the load current jumps to 500 mA. The system leaves DCM and switches to CCM. It should be emphasized here that the controller is operating in the same manner throughout the mode change and no reconfiguration of any parameters is needed.

Up to now, the present invention has been described using an exemplary power stage which is clocked by a clock signal $S_{CLK}$ of a constant frequency TNOM-1, wherein $T_{NOM}$ is the period of a PWM cycle. However, in one modification of the concept presented above the period of one PWM cycle may be varied by $\Delta T_{SW}$ so that the actual period $T_{ACT}$ equals TNOM+ ΔTSW. As sketched in FIGS. 8a and 8b, collectively FIG. 8, the variation $\Delta T_{SW}$ may be derived from the sliding function $S_{DIG}(x)$ by applying a function f(·) thereto. One example of the function f(·) is illustrated in FIG. 8b where a piecewise linear transfer function is applied to the sliding function $S_{DIG}(x)$ to obtain the value $\Delta T_{SW}$. When the sliding function $S_{DIG}(x)$ is around zero (i.e., in steady state) the PWM period correction is zero ($\Delta T_{SW}=0$) and the system operates at the nominal frequency TNOM-1. When the value of sliding function $S_{DIG}(x)$ falls below a negative threshold (i.e. in case of a positive load jump) a negative correction is applied making the switching period $T_{ACT}$ shorter. When the sliding function exceeds a positive threshold (i.e., in case of a negative load jump) a positive correction $\Delta T_{SW}$ is applied making the switching period $T_{ACT}$ longer.

FIG. 9 illustrates an alternative digital controller 2 structure to the structure of FIG. 9. The structure of the controller is essentially the same as in the example of FIG. 4. However, the fourth branch including the ramp correction is not needed here. Analogous the example of FIG. 4 a proportional and an integrating component of the output voltage $V_{O\_DIG}$ ($V_O=V_{REF}\rightarrow V_{O\_DIB}=0$) and an estimation of the inductor current contribute to a sliding function $S_{DIG}(x)$. In contrast to the example of FIG. 4 the PWM signal $S_{PWM}$ is not set in accordance with a clock signal $S_{CLK}$ having a fixed clock frequency, but rather set when the sliding function falls below a threshold THR2. Further, the PWM signal $S_{PWM}$ is reset to zero when the sliding function exceeds a second threshold THR1. Both thresholds may be monitored using a window comparator triggering a set or, respectively, a reset of the PWM signal $S_{PWM}$ when the sliding function leaves the window defined by the two thresholds THR1 and THR2.

Figure 10:
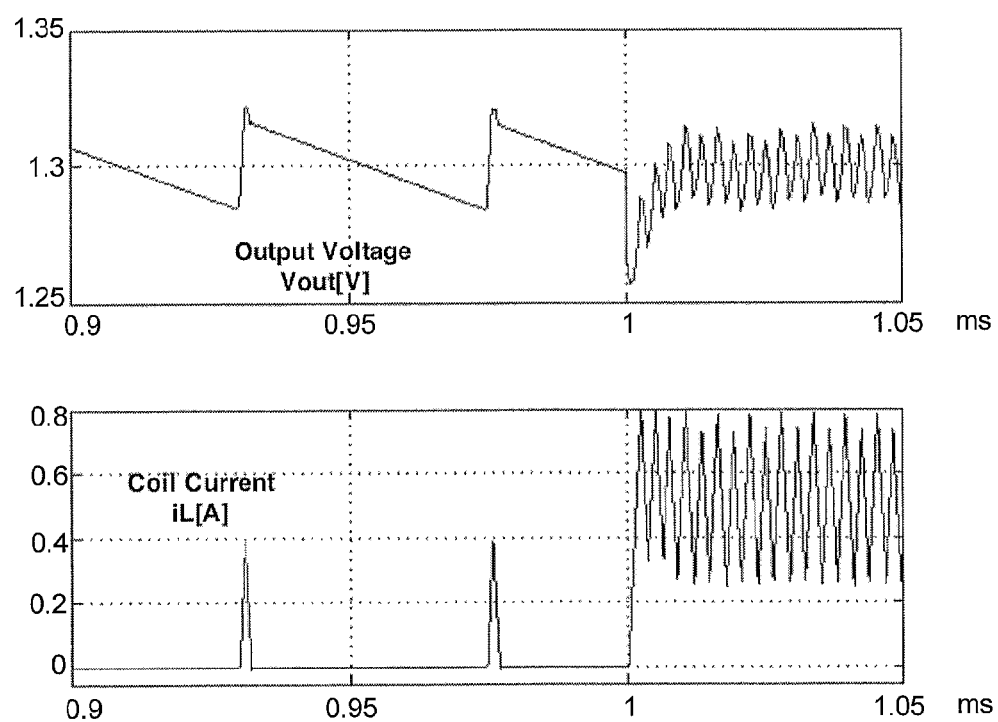
FIG. 10 illustrates the response of the coil current and the corresponding output voltage of a DC/DC converter to an abrupt change of the load when using the alternative controller design of FIG. 9.

FIG. 10 illustrates a simulation result for the controller implemented in accordance with the structure of FIG. 9. On the left side of the timing diagrams one can see that, the buck converter ($V_{REF}=1.3V$) is operating at a very low load current (iLOAD≈10 mA). The controller is operating in DCM and thus the buck converter is switching only for very short bursts and then remains in tri-state for quite a long time (about 30 kHz switching frequency). At time t=1 ms the load current suddenly rises to a high value (iLOAD≈500 mA). As a consequence, the buck converter starts to switch at a very high switching frequency. However, the switching frequency is not preset by a clock unlike in the example of FIG. 4.

Each individual feature described herein is disclosed in isolation and any combination of two or more such features is disclosed, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Aspects of the present invention may consist of any such individual feature or combination of features. In view of the foregoing description it will be evident to a person skilled in the art that various modifications may be made within the scope of the invention.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A switching converter comprising:
   a power stage receiving an input voltage for converting it into an output voltage and for providing a load current to a load operably coupled to the power stage, the power stage comprising an inductor carrying an inductor current; and
   a digital controller configured to regulate the output voltage to a level close to a reference voltage using a pulse width modulated (PWM) signal supplied to the power stage, the PWM signal having a duty cycle,
   wherein the digital controller regularly calculates a digital sliding function from at least the following: a digital representation of the output voltage, a digitally integrated output voltage value, and a digital estimation of the inductor current, and
   wherein the duty cycle of the PWM signal is set dependent on the calculated digital sliding function.

2. The switching converter of claim 1, wherein the digital controller is configured to calculate a digital ramp signal value which contributes to the digital sliding function.

3. The switching converter of claim 1, wherein the duty cycle of the PWM signal is determined by setting the PWM signal in accordance with a clock signal provided by a clock generator and resetting dependent on the calculated digital sliding function.

4. The switching converter of claim 1, wherein the duty cycle of the PWM signal is determined by setting and resetting the PWM signal dependent on the calculated digital sliding function.

5. The switching converter of claim 4, wherein the PWM signal is set to a high level when the calculated digital sliding function falls below a first threshold and reset to a low level when the calculated digital sliding function exceeds a second threshold.

6. The switching converter of claim 5, wherein the first and the second thresholds are equal or wherein the first and the second thresholds both equal zero.

7. The switching converter of claim 1, wherein the digital estimation of the inductor current is obtained from at least the following depending on a type of the power stage and on whether the inductor is accumulating or dispensing energy: the input voltage, the reference voltage or the output voltage, and a difference between the input voltage and the reference voltage or the output voltage, respectively.

8. The switching converter of claim 7 further comprising a zero-current-detection-circuit which is configured to signal when the inductor current is zero or below zero, so as to detect a zero current phase when operating in discontinuous conduction mode, the digital estimation of the inductor current, or its slope, being set to zero during the zero current phase.

9. The switching converter of claim 7, wherein the switching converter is a buck converter and the digital estimation of the inductor current is calculated from a difference between digital representations of the input voltage and the reference voltage or the output voltage, respectively, in phases of a rising inductor current, and from the digital representation of the reference voltage or the output voltage in phases of a falling inductor current.

10. The switching converter of claim 8, wherein the switching converter is a buck converter and the digital estimation of the inductor current is calculated from a difference between digital representations of the input voltage and the reference voltage or the output voltage, respectively, in phases of a rising inductor current, and from the digital representation of the reference voltage or the output voltage in phases of a falling inductor current.

11. The switching converter of claim 7, wherein the switching converter is a boost converter and the digital estimation of the inductor current is calculated from a digital representation of the input voltage in phases of a rising inductor current, and from a difference between digital representations of the input voltage and the reference voltage or the output voltage, respectively, in phases of a falling inductor current.

12. The switching converter of claim 8, wherein the switching converter is a boost converter and the digital estimation of the inductor current is calculated from a digital representation of the input voltage in phases of a rising inductor current, and from a difference between digital representations of the input voltage and the reference voltage or the output voltage, respectively, in phases of a falling inductor current.

13. The switching converter of claim 9, wherein the digital controller detects a phase of a rising inductor current when the PWM signal is set to a high level and a phase of a falling inductor current when the PWM signal is set to a low level and no zero current phase is signaled.

14. The switching converter of claim 1, wherein calculating the digital sliding function includes digitally integrating the digital estimation of the inductor current to obtain an integrated value, and regularly subtracting a fraction of the integrated value from the digital estimation of the inductor current.

15. The switching converter of claim 1, wherein calculating the digital sliding function includes digitally integrating the digital estimation of the inductor current to obtain an integrated value, low pass filtering the integrated value and subtracting the low pass filtered integrated value from the integrated value.

16. The switching converter of claim 3, wherein the clock signal has a clock frequency which is varied dependent on a value of the digital sliding function.

17. The switching converter of claim 16, wherein the clock frequency is increased when the digital sliding function falls below a third threshold and is decreased when the digital sliding function exceeds a fourth threshold.

18. The switching converter of claim 16, wherein the clock frequency is increased when the digital sliding function is negative and wherein the clock frequency is decreased when the digital sliding function is positive.

19. The switching converter claim 8 wherein the digital controller is configured to suppress, in the zero current phase, a provision of current to the inductor as long as the digital sliding function is above a fifth threshold.

20. The switching converter claim 19 wherein the fifth threshold equals zero.

\* \* \* \* \*